United States Patent
Bradford et al.

(10) Patent No.: US 8,782,568 B2
(45) Date of Patent: Jul. 15, 2014

(54) EXPLICIT CHARACTER FILTERING OF AMBIGUOUS TEXT ENTRY

(71) Applicant: Nuance Communications, Inc., Burlington, MA (US)

(72) Inventors: Ethan R. Bradford, Seattle, WA (US); Keith C. Hullfish, Snohomish, WA (US); David J. Kay, Seattle, WA (US); Pim van Meurs, Seattle, WA (US); Michael R. Longé, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/748,501

(22) Filed: Jan. 23, 2013

(65) Prior Publication Data

US 2013/0194191 A1     Aug. 1, 2013

Related U.S. Application Data

(63) Continuation of application No. 12/725,334, filed on Mar. 16, 2010, now Pat. No. 8,381,137, which is a continuation of application No. 10/176,933, filed on Jun. 20, 2002, now Pat. No. 7,712,053, which is a continuation-in-part of application No. 09/454,406, filed on Dec. 3, 1999, now Pat. No. 6,646,573.

(51) Int. Cl.
| | | |
|---|---|---|
| *G06F 3/14* | (2006.01) | |
| *G06F 3/048* | (2013.01) | |
| *H04M 1/00* | (2006.01) | |
| *H03M 11/00* | (2006.01) | |

(52) U.S. Cl.
USPC ........... 715/864; 715/200; 715/773; 715/811; 341/22; 400/485; 379/368

(58) Field of Classification Search
USPC .................... 715/200, 773, 864, 811; 341/22; 400/485; 379/368
See application file for complete search history.

(56) References Cited

U.S. PATENT DOCUMENTS

| | | |
|---|---|---|
| 3,967,273 A | 6/1976 | Knowlton |
| 4,164,025 A | 8/1979 | Dubnowski et al. |

(Continued)

FOREIGN PATENT DOCUMENTS

| | | |
|---|---|---|
| EP | 0313975 | 5/1989 |
| EP | 0319193 A2 | 6/1989 |

(Continued)

OTHER PUBLICATIONS

"America Online, Inc. Acquires Tegic Communications", www.tegic.com/pressreleases/pr_aolacquisition.html, Press Release from Tegic Communications, Dec. 1, 1999, 1-3.
"U.S. Appl. No. 12/830,227 Non-Final Office Action mailed Jul. 12, 2011", 19.

(Continued)

*Primary Examiner* — Eric Yen
(74) *Attorney, Agent, or Firm* — Michael A. Glenn; Perkins Coie LLP

(57) ABSTRACT

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

19 Claims, 7 Drawing Sheets

(56) References Cited

U.S. PATENT DOCUMENTS

| | | | |
|---|---|---|---|
| 4,191,854 A | 3/1980 | Coles | |
| 4,339,806 A | 7/1982 | Yoshida | |
| 4,360,892 A | 11/1982 | Endfield | |
| 4,396,992 A | 8/1983 | Hayashi et al. | |
| 4,427,848 A | 1/1984 | Tsakanikas | |
| 4,442,506 A | 4/1984 | Endfield | |
| 4,464,070 A | 8/1984 | Hanft et al. | |
| 4,481,508 A | 11/1984 | Kamei et al. | |
| 4,544,276 A | 10/1985 | Horodeck | |
| 4,586,160 A | 4/1986 | Amano et al. | |
| 4,649,563 A | 3/1987 | Riskin | |
| 4,661,916 A | 4/1987 | Baker et al. | |
| 4,669,901 A | 6/1987 | Feng | |
| 4,674,112 A | 6/1987 | Kondraske et al. | |
| 4,677,659 A | 6/1987 | Dargan | |
| 4,679,951 A | 7/1987 | King et al. | |
| 4,744,050 A | 5/1988 | Hirosawa et al. | |
| 4,754,474 A | 6/1988 | Feinson | |
| RE32,773 E | 10/1988 | Goldwasser et al. | |
| 4,791,556 A | 12/1988 | Vilkaitis | |
| 4,807,181 A | 2/1989 | Duncan | |
| 4,817,129 A | 3/1989 | Riskin | |
| 4,866,759 A | 9/1989 | Riskin | |
| 4,872,196 A | 10/1989 | Royer et al. | |
| 4,891,786 A | 1/1990 | Goldwasser | |
| 4,969,097 A | 11/1990 | Levin | |
| 5,018,201 A | 5/1991 | Sugawara | |
| 5,031,206 A | 7/1991 | Riskin | |
| 5,041,967 A | 8/1991 | Ephrath et al. | |
| 5,067,103 A | 11/1991 | Lapeyre | |
| 5,109,352 A | 4/1992 | O'Dell | |
| 5,128,672 A | 7/1992 | Kaehler | |
| 5,131,045 A | 7/1992 | Roth | |
| 5,133,012 A | 7/1992 | Nitta | |
| 5,163,084 A | 11/1992 | Kim et al. | |
| 5,200,988 A | 4/1993 | Riskin | |
| 5,210,689 A | 5/1993 | Baker et al. | |
| 5,218,538 A | 6/1993 | Zhang | |
| 5,229,936 A | 7/1993 | Decker et al. | |
| 5,255,310 A | 10/1993 | Kim et al. | |
| 5,258,748 A | 11/1993 | Jones | |
| 5,288,158 A | 2/1994 | Matias | |
| 5,289,394 A | 2/1994 | Lapeyre | |
| 5,303,299 A | 4/1994 | Hunt et al. | |
| 5,305,205 A | 4/1994 | Weber et al. | |
| 5,339,358 A | 8/1994 | Danish et al. | |
| 5,371,851 A * | 12/1994 | Pieper et al. | 345/501 |
| 5,373,290 A * | 12/1994 | Lempel et al. | 341/51 |
| 5,388,061 A | 2/1995 | Hankes | |
| 5,392,338 A | 2/1995 | Danish et al. | |
| 5,406,480 A * | 4/1995 | Kanno | 704/10 |
| 5,535,421 A | 7/1996 | Weinreich | |
| 5,559,512 A | 9/1996 | Jasinski et al. | |
| 5,586,198 A | 12/1996 | Lakritz | |
| 5,623,261 A | 4/1997 | Rose | |
| 5,642,522 A | 6/1997 | Zaenen et al. | |
| 5,664,896 A | 9/1997 | Blumberg | |
| 5,680,511 A | 10/1997 | Baker et al. | |
| 5,748,512 A | 5/1998 | Vargas | |
| 5,786,776 A | 7/1998 | Kisaichi et al. | |
| 5,797,098 A | 8/1998 | Schroeder et al. | |
| 5,805,911 A | 9/1998 | Miller | |
| 5,818,437 A * | 10/1998 | Grover et al. | 715/811 |
| 5,825,353 A | 10/1998 | Will | |
| 5,828,991 A | 10/1998 | Skiena et al. | |
| 5,847,697 A | 12/1998 | Sugimoto | |
| 5,855,000 A | 12/1998 | Waibel et al. | |
| 5,896,321 A | 4/1999 | Miller et al. | |
| 5,917,890 A | 6/1999 | Brotman et al. | |
| 5,917,941 A | 6/1999 | Webb et al. | |
| 5,926,566 A | 7/1999 | Wang et al. | |
| 5,936,556 A | 8/1999 | Sakita | |
| 5,937,380 A | 8/1999 | Segan | |
| 5,937,422 A | 8/1999 | Nelson et al. | |
| 5,945,928 A * | 8/1999 | Kushler et al. | 341/28 |
| 5,952,942 A * | 9/1999 | Balakrishnan et al. | 341/20 |
| 5,953,541 A * | 9/1999 | King et al. | 710/67 |
| 5,960,385 A | 9/1999 | Skiena et al. | |
| 5,963,671 A | 10/1999 | Comerford et al. | |
| 5,999,950 A | 12/1999 | Krueger et al. | |
| 6,005,498 A | 12/1999 | Yang et al. | |
| 6,009,444 A | 12/1999 | Chen | |
| 6,011,554 A | 1/2000 | King et al. | |
| 6,041,323 A | 3/2000 | Kubota | |
| 6,044,347 A * | 3/2000 | Abella et al. | 704/272 |
| 6,054,941 A | 4/2000 | Chen | |
| 6,073,101 A | 6/2000 | Maes | |
| 6,098,086 A | 8/2000 | Krueger et al. | |
| 6,104,317 A | 8/2000 | Panagrossi | |
| 6,120,297 A | 9/2000 | Morse, III et al. | |
| 6,130,628 A | 10/2000 | Schneider-hufschmidt et al. | |
| 6,169,538 B1 | 1/2001 | Nowlan et al. | |
| 6,172,625 B1 | 1/2001 | Jin et al. | |
| 6,178,401 B1 | 1/2001 | Franz et al. | |
| 6,204,848 B1 | 3/2001 | Nowlan et al. | |
| 6,208,966 B1 | 3/2001 | Bulfer et al. | |
| 6,219,731 B1 | 4/2001 | Gutowitz | |
| 6,223,059 B1 | 4/2001 | Haestrup | |
| 6,246,761 B1 | 6/2001 | Cuddy | |
| 6,286,064 B1 * | 9/2001 | King et al. | 710/67 |
| 6,304,844 B1 | 10/2001 | Pan et al. | |
| 6,307,548 B1 | 10/2001 | Flinchem et al. | |
| 6,307,549 B1 | 10/2001 | King et al. | |
| 6,346,894 B1 | 2/2002 | Connolly et al. | |
| 6,362,752 B1 | 3/2002 | Guo et al. | |
| 6,363,347 B1 | 3/2002 | Rozak | |
| 6,377,965 B1 | 4/2002 | Hachamovitch et al. | |
| 6,392,640 B1 | 5/2002 | Will | |
| 6,407,679 B1 * | 6/2002 | Evans et al. | 341/20 |
| 6,421,672 B1 | 7/2002 | McAllister et al. | |
| 6,424,743 B1 | 7/2002 | Ebrahimi | |
| 6,453,281 B1 * | 9/2002 | Walters et al. | 704/200 |
| 6,466,232 B1 | 10/2002 | Newell et al. | |
| 6,502,118 B1 | 12/2002 | Chatterjee | |
| 6,542,170 B1 | 4/2003 | Williams et al. | |
| 6,559,778 B1 | 5/2003 | Hillmering | |
| 6,567,075 B1 | 5/2003 | Baker et al. | |
| 6,574,597 B1 | 6/2003 | Mohri et al. | |
| 6,584,179 B1 | 6/2003 | Fortier et al. | |
| 6,633,846 B1 | 10/2003 | Bennett et al. | |
| 6,636,162 B1 * | 10/2003 | Kushler et al. | 341/28 |
| 6,646,573 B1 * | 11/2003 | Kushler et al. | 341/28 |
| 6,665,640 B1 | 12/2003 | Bennett et al. | |
| 6,684,185 B1 | 1/2004 | Junqua et al. | |
| 6,686,852 B1 | 2/2004 | Guo | |
| 6,711,290 B2 | 3/2004 | Sparr et al. | |
| 6,728,348 B2 | 4/2004 | Denenberg et al. | |
| 6,734,881 B1 * | 5/2004 | Will | 715/811 |
| 6,738,952 B1 | 5/2004 | Yamamuro | |
| 6,751,605 B2 | 6/2004 | Gunji et al. | |
| 6,757,544 B2 | 6/2004 | Rangarajan et al. | |
| 6,801,190 B1 | 10/2004 | Robinson et al. | |
| 6,801,659 B1 * | 10/2004 | O'Dell | 382/185 |
| 6,807,529 B2 | 10/2004 | Johnson et al. | |
| 6,848,080 B1 * | 1/2005 | Lee et al. | 715/203 |
| 6,864,809 B2 | 3/2005 | O'Dell et al. | |
| 6,885,317 B1 | 4/2005 | Gutowitz | |
| 6,912,581 B2 | 6/2005 | Johnson et al. | |
| 6,920,420 B2 | 7/2005 | Lin | |
| 6,934,564 B2 | 8/2005 | Laukkanen et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,973,332 B2 | 12/2005 | Mirkin et al. | |
| 6,982,658 B2 | 1/2006 | Guo | |
| 6,985,933 B1 | 1/2006 | Singhal et al. | |
| 7,006,820 B1 | 2/2006 | Parker et al. | |
| 7,013,258 B1 | 3/2006 | Su et al. | |
| 7,020,849 B1 | 3/2006 | Chen | |
| 7,027,976 B1 | 4/2006 | Sites | |
| 7,030,863 B2 | 4/2006 | Longe | |
| 7,057,607 B2 | 6/2006 | Mayoraz et al. | |
| 7,061,403 B2 | 6/2006 | Fux | |
| 7,075,520 B2 | 7/2006 | Williams | |

(56) References Cited

U.S. PATENT DOCUMENTS

| | | | |
|---|---|---|---|
| 7,095,403 B2 | 8/2006 | Lyustin | |
| 7,098,896 B2 | 8/2006 | Kushler et al. | |
| 7,107,204 B1* | 9/2006 | Liu et al. | 704/2 |
| 7,139,430 B2 | 11/2006 | Sparr et al. | |
| 7,152,213 B2 | 12/2006 | Pu et al. | |
| 7,224,292 B2 | 5/2007 | Lazaridis et al. | |
| 7,256,769 B2 | 8/2007 | Pun et al. | |
| 7,257,528 B1 | 8/2007 | Ritchie et al. | |
| 7,263,238 B2* | 8/2007 | Singh | 382/244 |
| 7,272,564 B2 | 9/2007 | Phillips et al. | |
| 7,313,277 B2 | 12/2007 | Morwing et al. | |
| 7,349,576 B2 | 3/2008 | Holtsberg | |
| 7,386,454 B2 | 6/2008 | Gopinath et al. | |
| 7,387,457 B2* | 6/2008 | Jawerth et al. | 400/489 |
| 7,389,235 B2 | 6/2008 | Dvorak | |
| 7,395,203 B2 | 7/2008 | He | |
| 7,437,001 B2 | 10/2008 | Morwing et al. | |
| 7,466,859 B2 | 12/2008 | Chang et al. | |
| 7,598,890 B2 | 10/2009 | Park et al. | |
| 7,626,574 B2 | 12/2009 | Kim | |
| 7,679,534 B2 | 3/2010 | Kay et al. | |
| 7,712,053 B2* | 5/2010 | Bradford et al. | 715/864 |
| 7,881,936 B2 | 2/2011 | Longe et al. | |
| 8,036,878 B2* | 10/2011 | Assadollahi | 704/10 |
| 8,095,364 B2 | 1/2012 | Longe et al. | |
| 8,103,499 B2* | 1/2012 | Lai et al. | 704/4 |
| 8,381,137 B2* | 2/2013 | Bradford et al. | 715/864 |
| 2001/0040517 A1 | 11/2001 | Kisaichi et al. | |
| 2002/0019731 A1 | 2/2002 | Masui et al. | |
| 2002/0038207 A1 | 3/2002 | Mori et al. | |
| 2002/0054135 A1* | 5/2002 | Noguchi et al. | 345/788 |
| 2002/0072395 A1 | 6/2002 | Miramontes et al. | |
| 2002/0097227 A1 | 7/2002 | Chu et al. | |
| 2002/0119788 A1 | 8/2002 | Parupudi et al. | |
| 2002/0126097 A1 | 9/2002 | Savolainen | |
| 2002/0135499 A1 | 9/2002 | Guo | |
| 2002/0145587 A1 | 10/2002 | Watanabe | |
| 2002/0152075 A1 | 10/2002 | Kung et al. | |
| 2002/0188448 A1 | 12/2002 | Goodman et al. | |
| 2002/0196163 A1* | 12/2002 | Bradford et al. | 341/22 |
| 2003/0011574 A1 | 1/2003 | Goodman | |
| 2003/0023420 A1 | 1/2003 | Goodman | |
| 2003/0023426 A1 | 1/2003 | Pun et al. | |
| 2003/0036411 A1 | 2/2003 | Kraft | |
| 2003/0054830 A1 | 3/2003 | Williams et al. | |
| 2003/0078038 A1 | 4/2003 | Kurosawa et al. | |
| 2003/0088398 A1 | 5/2003 | Guo et al. | |
| 2003/0095102 A1 | 5/2003 | Kraft et al. | |
| 2003/0101060 A1 | 5/2003 | Bickley | |
| 2003/0104839 A1 | 6/2003 | Kraft et al. | |
| 2003/0119561 A1 | 6/2003 | Hatch et al. | |
| 2003/0144830 A1 | 7/2003 | Williams | |
| 2003/0179930 A1 | 9/2003 | O'Dell et al. | |
| 2003/0193478 A1 | 10/2003 | Ng et al. | |
| 2003/0212563 A1 | 11/2003 | Ju et al. | |
| 2004/0049388 A1 | 3/2004 | Roth et al. | |
| 2004/0052355 A1 | 3/2004 | Awada et al. | |
| 2004/0067762 A1 | 4/2004 | Balle | |
| 2004/0104896 A1 | 6/2004 | Suraqui | |
| 2004/0127197 A1 | 7/2004 | Roskind | |
| 2004/0127198 A1 | 7/2004 | Roskind et al. | |
| 2004/0135774 A1 | 7/2004 | La Monica | |
| 2004/0153963 A1 | 8/2004 | Simpson et al. | |
| 2004/0153975 A1 | 8/2004 | Williams et al. | |
| 2004/0155869 A1 | 8/2004 | Robinson et al. | |
| 2004/0163032 A1 | 8/2004 | Guo et al. | |
| 2004/0169635 A1 | 9/2004 | Ghassabian | |
| 2004/0201607 A1 | 10/2004 | Mulvey et al. | |
| 2004/0203656 A1 | 10/2004 | Andrew et al. | |
| 2004/0243257 A1 | 12/2004 | Theimer | |
| 2004/0259598 A1 | 12/2004 | Wagner et al. | |
| 2005/0017954 A1 | 1/2005 | Kay et al. | |
| 2005/0114770 A1 | 5/2005 | Sacher et al. | |
| 2006/0007162 A1 | 1/2006 | Kato | |
| 2006/0010206 A1 | 1/2006 | Apacible et al. | |
| 2006/0028450 A1 | 2/2006 | Suraqui | |
| 2006/0088356 A1* | 4/2006 | Jawerth et al. | 400/472 |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | Lapointe et al. | |
| 2006/0173807 A1 | 8/2006 | Weir et al. | |
| 2006/0190822 A1 | 8/2006 | Basson et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2006/0265208 A1* | 11/2006 | Assadollahi | 704/9 |
| 2007/0094718 A1 | 4/2007 | Simpson | |
| 2007/0203879 A1 | 8/2007 | Templeton-Steadman et al. | |
| 2007/0276814 A1 | 11/2007 | Williams | |
| 2007/0285397 A1 | 12/2007 | Lapointe et al. | |
| 2008/0130996 A1 | 6/2008 | Sternby | |
| 2008/0235003 A1* | 9/2008 | Lai et al. | 704/8 |

FOREIGN PATENT DOCUMENTS

| | | |
|---|---|---|
| EP | 0464726 A2 | 1/1992 |
| EP | 0540147 | 5/1993 |
| EP | 0660216 A1 | 12/1994 |
| EP | 0651315 A1 | 5/1995 |
| EP | 0732646 A2 | 9/1996 |
| EP | 0751469 A1 | 1/1997 |
| EP | 1031913 A2 | 8/2000 |
| EP | 1035712 A2 | 9/2000 |
| EP | 1256875 | 11/2002 |
| EP | 1296216 A1 | 3/2003 |
| EP | 1320023 A2 | 6/2003 |
| EP | 1324573 A2 | 7/2003 |
| EP | 1341156 | 9/2003 |
| EP | 1347361 A1 | 9/2003 |
| EP | 1347362 A1 | 9/2003 |
| EP | 1522920 | 4/2005 |
| GB | 2298166 | 8/1996 |
| GB | 2383459 | 6/2003 |
| JP | 61-282965 | 12/1986 |
| JP | 03-141460 | 6/1991 |
| JP | 1990117218 | 1/1992 |
| JP | 1993265682 | 10/1993 |
| JP | 8006939 | 1/1996 |
| JP | 1997114817 | 5/1997 |
| JP | 1997212503 | 8/1997 |
| JP | 11-312046 | 11/1999 |
| JP | 2000-508093 | 6/2000 |
| JP | 2001-509290 | 7/2001 |
| JP | 2001-224075 | 8/2001 |
| JP | 2001-251395 | 9/2001 |
| JP | 2002-014956 | 1/2002 |
| JP | 2002-141996 | 5/2002 |
| JP | 2002351862 | 12/2002 |
| JP | 2003-196273 | 7/2003 |
| JP | 2003-116179 | 8/2003 |
| TW | 476033 | 2/2002 |
| TW | 559783 | 11/2003 |
| WO | WO-8200442 | 2/1982 |
| WO | WO-9007149 | 6/1990 |
| WO | WO-9627947 | 9/1996 |
| WO | WO-97/005541 A1 | 2/1997 |
| WO | WO-9704580 | 2/1997 |
| WO | WO 9833111 | 7/1998 |
| WO | WO-0035091 | 6/2000 |
| WO | WO-0358420 A2 | 7/2003 |
| WO | WO-03060451 A1 | 7/2003 |
| WO | WO-2004003721 | 1/2004 |
| WO | WO-2004/111812 A2 | 12/2004 |
| WO | WO-2004/111871 A1 | 12/2004 |
| WO | WO-2004110040 | 12/2004 |
| WO | WO-2006/026908 A1 | 3/2006 |

OTHER PUBLICATIONS

"http://pitecan.com/OpenPOBoxInfo/index.html", Jul. 23, 2001.

"Latest Philips Wireless Handset Ships With T9 Text Input in China", Business Wire, www.businesswire.com/webbox/bw.110999/193130342.htm, Nov. 9, 1999, Total of 2 pages.

(56) References Cited

OTHER PUBLICATIONS

"Making Multi-tap Intelligent", http://www.zicorp.com/ezitap.htm, retrieved Feb. 7, 2006, 2005, Total of 1 page.
"Motorola Lexicus Technologies & SOK's iTAP page", www.motorola.com/lexicus/html/itap_FAQ.html, retrieved Sep. 6, 2002, 2002, Total of 1 page.
"POBox Server", http://pitecan.com/OpenPOBox/info/index.html, Jul. 23, 2001, Total of 1 page.
"Speed Keyboard for Data Processor", IBM Technical Disclosure Bulletin, vol. 23, Jul. 1980, Total of 3 pages.
"Tapless ppd Gen3.0", http://www.tapless.biz, retrieved from website Feb. 7, 2006, 2006, Total of 1 page.
"Welcome to the Nuance Corporate Website", http://www.nuance.com/, Retrieved on Feb. 7, 2006 from website, 2006, Total of 2 pages.
"What is writing?", http://www.ling.upenn.edu/courses/Fall_2003/ling001/reading_writing.html, Linguistics 001. Lecture 19, Reading and Writing, 2003, Total of 13 pages.
"WordLogic for Handheld Computers", Retrieved from webarchive.org, http://web.archive.org/web/20051030092534/www.wordlogic.com/products-predictive-keyboard-handheld-prediction.asp, Oct. 30, 2005, Total of 1 page.
"Zi Claims Second Patent Victory Against Tegic Communications, a unit of AOL Time Warner", www.zicorp.com/pressreleases/031402.html, News Release from Zi Corporation, Mar. 14, 2002, 1-2.
"*Zi Corporation, Inc. v. Tegic Communications, Inc.*", www.zicorp.com/pressreleases/031402.html, Summary Judgment Orders, Mar. 13, 2002, 1-7.
Ajioka, Y., "Prediction of Nexet Alphabets and Words of Four Sentences by Adaptive Injunctions", IJCNN-91-Seattle: Int'l Joint Conference on Neural Networks, Anzai, Y (Additional Author), Cat. No. 91CH3049-4, vol. 2; IEEE, NY, NY USA, 1991, 897.
Arnott, John, "Probabilistic Character Disambiguation for Reduced Keyboards Using Small Text Samples", AAC Augmentative and Alternative Communication, vol. 8, No. 3, Dept. Math & comp. Sci.; Univ of Dundee, Dundee, Tayside, Scotland, Sep. 1992, 215-223.
Butts, L., "An Evaluation of Mobile Phone Text Input Methods", Conferences in Research and Practice in Information Technology, Cockburn, A. (Additional Author), vol. 7, University of Canterbury, Dept of Computer Science, Christchurch, New Zealand AUIC2002, Melbourne Australia, Australian Computer Society, 2001, Total of 6 pages.
Cockburn, A., "Evaluating Mobile Text Entry with Fastap™ Keyboard", People and Computers XVII (vol. 2): British Computer Society Conference on Human Computer Interaction, Siresena (Additional Author), Bath, England, 2003, 77-820.
Coppola, P. et al., "Mobe: a framework for context-aware mobile applications", In: Proc. Of Workshop on Context Awareness for Proactive Systems, Helsinki University Press, ISBN:952-10-2518-2, 2005, 55-65.
Defrancis, John, "The Ideographic Myth", The Chinese Language: Face and Fantasy, University of Hawi'i Press, Link to chapter: http://www.pinyin.info/readings/texts/ideographic_myth.html, 1984, Total of 13 pages.
Demasco, Patrick W. et al., "Generating Text From Compressed Input: An Intelligent Interface for People with Sever Motor Impairments", Communications of the ACM, vol. 35 No. 5, May 1992, 68-78.
Dey, A.K., "Towards a better understanding of context and context-awareness", GVU Technical Report, Abowd, G. D. (Additional Author), GVU Center, GIT-GVU-99-2, Atlanta GA, USA, 1999, Total of 12 pages.
Foulds, Richard et al., "Lexical Prediction Techniques Applied to Reduce Motor Requirements for Augmentative Communication", RESNA 10th Annual Conference, San Jose, California, 1987, 115-117.
Foulds, Richard et al., "Statistical Disambiguation of Multi-Character Keys Applied to Reduce Motor Requirements for Augmentative and Alternative Communication", AAC Augmentative and Alternative Communication, 1987, 192-195.

Gavalda, M., "Epiphenomenal Grammar Acquisition with GSG", Proceedings of the Workshop on Conversational Systems of the 6th Conf. on Applied Natural Language Processing and the 1st Conf. of the N. American Chapter of the Assoc. for Computational Linguistics, Seattle, Washington, (ANLP/NAACL-2000), May 2000, Total of 6 pages.
James, Christina et al., "Bringing Text Input Beyond the Desktop", CHI 2000, Seattle, WA, Apr. 1-6, 2000, Apr. 2000, 49-50.
James, Christina L. et al., "Text Input for Mobile Devices: Comparing Model Prediction to Actual Performance", SIGCHI '01, Seattle, WA, Mar. 31-Apr. 4, 2001, ACM 1-58113-327-8/01/0003, 2001, 365-371.
Kamphuis, Harry et al., "Katdas; A Small Number of Keys Direct Access System", RESNA 12th Annual Conference, New Orleans, Louisiana, 1989, 278-279.
King, Martin T. et al., "JustType-Efficient Communication with Eight Keys", Proceedings of the RESNA '95 Annual Conference, Vancouver, BC, Canada, 1995, Total of 3 pages.
Kreifeldt, J.G. et al., "Reduced Keyboard Designs Using Disambiguation", Proceedings of the Human Factors Society 33rd Annual Meeting, 1989, 441-444.
Kronlid, F et al., "TreePredict, Improving Text Entry on PDA's", Proceedings of the Conference on Human Factors in Computing Systems, CH12001, ACM press, 2001, 441-442.
Kushler, Cliff, "AAC Using A Reduced Keyboard", www.dinf.ne.jp/doc/english/Us_Eu/conf/csun_98/csun98_140.htm, CSUN 98 Papers, Web Posted Mar. 3, 1998, 1998, Total of 4 pages.
Lesher, Gregory W. et al., "Optimal Character Arrangements for Ambiguous Keyboards", IEEE Transactions on Rehabilitation Engineering, vol. 6, No. 4, Dec. 1998, 415-423.
Levine, Stephen H. et al., "Adaptive Technique for Customized Interface Design With Application to Nonvocal Communication", RESNA 9th Annual Conference, Minneapolis, Minnesota, 1986, 399-401.
Levine, Stephen H., "An Adaptive Approach to Optimal Keyboard Design for Nonvocal Communication", IEEE, 1985, 334-337.
Levine, Stephen H. et al., "Computer Disambiguation of Multi-Character Key Text Entry: An Adaptive Design Approach", IEEE, 1986, 298-301.
Levine, Stephen H. et al., "Multi-Character Key Text Entry Using Computer Disambiguation", RESNA 10th Annual Conference, San Jose, California, 1987, 177-178.
Mackenzie, et al., "Text Entry for Mobile Computing: Models and Methods, Theory and Practice", www.yorku.ca/mack/hci3.html, Retrieved Sep. 6, 2002, 2002, Total of 26 pages.
Mackenzie, I. Scott et al., "LetterWise: Prefix-based Disambiguation for Mobile Text Input", UIST '01, Orlando, FL, Nov. 11-14, 2001, ACM 1-58113-438-x/01/11, 2001, 111-120.
Martin, T. et al., "Learning User Models for an Intelligent Telephone Assistant", Proceedings Joint 9th IFSA World Congress and 20th NAFIPS Intnl. Conf., IEEE, vol. 2, Piscataway, NJ, USA, Cat. No. 01TH8569, 2001, 669-674.
Masui, T., "POBox: An Efficient Text Input Method for Handheld and Ubiquitous Computers", Sony Computer Science Laboratories, Apr. 1998, Total of 12 pages.
Matias, Edgar, "Half-QWERTY: Typing With One Hand Using Your Two-Handed Skills", Conference Companion, CFI '94, Apr. 24-28, 1994, Apr. 1994, 51-52.
Minneman, Scott L., "A Simplified Touch-Tone Telecommunication Aid for Deaf and Hearing Impaired Individuals", RESNA 8th Annual Conference, Memphis Tennessee, 209-211, 1985.
Oommen, B. John et al., "String Taxonomy Using Learning Automata", IEEE Transactions on Systems, Mand and Cybernetics—Part B: Cybernetics, vol. 27 No. 20, Apr. 1997, 354-365.
Oommen, B.J. et al., "Correction to 'An Adaptive Learning Solution to the Keyboard Optimization Problem'", IEEE Transactions on Systems, Man and Cybernetics, vol. 22, No. 5, Oct. 1992, 1233-1243.
Oviatt, Sharon, "Mutual Disambiguation of Recognition Errors in a Multimodal Architecture", CHI 99, May 15-29, May 1999, 576-583.
Rosa, J., "A Biologically Motivated Connectionist System for Predicting the Next Word in Natural Language Sentence", IEEEE Intnl Conference on Systems, man and Cybernetics; Conf. Proceedings, Cat. No. 02CH37349, Part vol. 4, p. 6, Yasmine Hammamet, Tunisia, 2002, Total of 2 pages.

(56) References Cited

OTHER PUBLICATIONS

Rosa, J., "Next Word Prediction in a Connectional Distributed Representation System", IEEEE Intnl Conference on Systems, man and Cybernetics; Conf. Proceedings, Cat. No. 02CH37349, Part vol. 3, p. 6, Yasmine Hammamet, Tunisia, 2002, Total of 2 pages.

Schmidt, A. et al., "Advanced Interaction in Context", In Proceedings of First International Symposium of Handheld and Ubiquitous Computing, Karlsruhe, Germany, Sep. 1999, 89-101.

Shieber, S., "Abbreviated Text Input", Abbreviated Text Input, Baker, E. (Additional Author), Harvard University, Cambridge, MA, USA shieber@deas.harvard.edu, ellie@eecs.harvard.edu, ACM 1-58113-586-6/03/0001, 2003, 293-296.

Siewiorek, D.P. et al., "SenSay: A context-aware mobile phone", In proceedings of the 7th International Symposium on Wearable Computers, IEEE Press, 2003, 248-249.

Silfverberg, Miika et al., "Predicting Text Entry Speed on Mobile Phones", CHI 2000, The Hague, Amsterdam, Apr. 1-6, 2000, ACM 1-58113-216-6/00/04, Apr. 2000, 916.

Smith, Sidney L. et al, "Alphabetic Data Entry Via the Touch-Tone Pad: A Comment", Human Factors, vol. 13 No. 2, Apr. 1971, 189-190.

Sugimoto, Masakatsu et al., "SHK: Single Hand Key Card for Mobile Devices", CHI 1996, Apr. 13-18, 1996, Apr. 1996, 7-8.

Sugimoto, Masakatsu , "Single-Hand Input Scheme for English and Japanese Text", Fujitsu Sci. Tech.J., vol. 33 No. 2, Dec. 1997, 189-195.

Suhm, B. et al., "Multimodal Error Correction for Speech User Interfaces", ACM Transactions on Computer-Human Interaction, vol. 8, Mar. 2001, 60-98.

Swiffin, Andrew L. et al., "Adaptive and Predictive Techniques in a Communications Prosthesis", AAC Augmentative and Alternative Communication, 1987, 181-191.

Swiffin, Andrew L. et al., "PAL: An Effort Efficient Portable Communication Aid and Keyboard Emulator", RESNA 8th Annual Conference, Memphis, Tennessee, 1985, 197 & 199.

Tygran, Amalyan , "T9 or Text Predicative Input in Mobile Telephones", Business Wire, web.archive.org/wweb/20010723054055/ http://www.digit-life.com/articles/mobilet9/, Jul. 23, 2001, 1-5.

Witten, I.H. , "Principles of Computer Speech", New York: Academic Press, 1982, 246-253.

Xu, Jinxi et al., "Corpus-Based Stemming Using Cooccurrence of Word Variants", CM Transactions on Information Systems, vol. 16 No. 1, ACM 1046-8188/98/0100-0061, Jan. 1989, 61-81.

Yang, Y et al., "A Comparative Study on Feature Selection in Text Categorization", Proceedings of ICML 1997, 1997, 412-420.

Zernik, U. , "Language Acquisition: Coping with Lexical Gaps", Proceedings of the 12th International Conference on Computational Linguistics, Budapest, Hungary, 1998, 796-800.

"Novice-to-Novice: Keyboards, Consoles, and VT Cruising", Linux Journal, vol. 1996, Issue 31es, Nov. 1996, 9 pages.

* cited by examiner

| KEY | UNSHIFTED CHARACTERS | | | | | | SHIFTED CHARACTERS | | | | | |
|---|---|---|---|---|---|---|---|---|---|---|---|---|
| 1 | . | , | - | ? | ! | ' | . | , | - | ? | ! | ' |
|   | @ | : | 1 | | | | @ | : | 1 | | | |
| 2 | a | b | c | ç | à | â | A | B | C | Ç | À | Â |
|   | á | ä | 2 | | | | Á | Ä | 2 | | | |
| 3 | d | e | f | é | è | ê | D | E | F | É | È | Ê |
|   | ë | 3 | | | | | Ë | 3 | | | | |
| 4 | g | h | i | î | ï | í | G | H | I | Î | Ï | Í |
|   | 4 | | | | | | 4 | | | | | |
| 5 | j | k | l | 5 | | | J | K | L | 5 | | |
| 6 | m | n | o | ô | ó | ö | M | N | O | Ô | Ó | Ö |
|   | ñ | 6 | | | | | Ñ | 6 | | | | |
| 7 | p | q | r | s | β | 7 | P | Q | R | S | | 7 |
| 8 | t | u | v | ù | û | ú | T | U | V | Ù | Û | Ú |
|   | ü | 8 | | | | | Ü | 8 | | | | |
| 9 | w | x | y | z | 9 | | W | X | Y | Z | 9 | |
| 0 | 0 | | | | | | 0 | | | | | |

FIG. 3

EXPLICIT CHARACTER FILTERING OF AMBIGUOUS TEXT ENTRY

CROSS-REFERENCE TO RELATED APPLICATIONS

This application is a Continuation of U.S. patent application Ser. No. 12/725,334 filed Mar. 16, 2010, now U.S. Pat. No. 8,381,137 which is a Continuation of U.S. patent application Ser. No. 10/176,933 filed 20 Jun. 2002, now U.S. Pat. No. 7,712,053, which is a Continuation-in-Part of U.S. patent application Ser. No. 09/454,406, filed Dec. 3, 1999, entitled "REDUCED KEYBOARD TEXT INPUT SYSTEM FOR THE JAPANESE LANGUAGE", now U.S. Pat. No. 6,646,573. The disclosure of all of these related application are hereby incorporated by reference in their entirety.

BACKGROUND OF THE INVENTION

1. Technical Field

The invention relates to text input technology. More specifically, the invention relates to text entry solutions to wireless communication devices with limited keypads.

2. Description of the Prior Art

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user. Incorporating a full-size keyboard in a portable computer also hinders true portable use of the computer. Most portable computers cannot be operated without placing the computer on a flat work surface to allow the user to type with both hands. A user cannot easily use a portable computer while standing or moving.

In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory.

Presently, a tremendous growth in the wireless industry has spawned reliable, convenient, and very popular mobile communications devices available to the average consumer, such as cell phones, two-way pagers, PDAs, etc. These handheld wireless communications and computing devices requiring text input are becoming smaller still. Recent advances in two-way paging, cellular telephones, and other portable wireless technologies have led to a demand for small and portable two-way messaging systems, and especially for systems which can both send and receive electronic mail ("e-mail"). Some wireless communications device manufacturers also desire to provide to consumers devices with which the consumer can operate with the same hand that is holding the device.

Disambiguation Background.

Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, since each keystroke may indicate one of several letters. Several approaches have been suggested for resolving the ambiguity of the keystroke sequence, referred to as disambiguation.

One suggested approach for unambiguously specifying characters entered on a reduced keyboard requires the user to enter, on average, two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context.

Another suggested approach based on word-level disambiguation is disclosed in a textbook entitled Principles of Computer Speech, authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

H. A. Gutowitz, Touch-Typable Devices Based on Ambiguous Codes and Methods to Design Such Devices, WO 00/35091 (Jun. 15, 2000) discloses that the design of typable devices, and, in particular, touch-type devices embodying ambiguous codes presents numerous ergonomical problems and proposes some solutions for such problems. Gutowitz teaches methods for the selection of ambiguous codes from the classes of strongly-touch-typable ambiguous codes and substantially optimal ambiguous codes for touch-typable devices such as computers, PDA's, and the like, and other information appliances, given design constraints, such as the size, shape and computational capacity of the device, the typical uses of the device, and conventional constraints such as alphabetic ordering or Qwerty ordering.

Eatoni Ergonomics Inc. provides a system called WordWise, (Copyright 2001 Eatoni Ergonomics Inc.), adapted from a regular keyboard, and where a capital letter is typed on a regular keyboard, and an auxiliary key, such as the shift key, is held down while the key with the intended letter is pressed. The key idea behind WordWise is to choose one letter from each of the groups of letters on each of the keys on the telephone keypad. Such chosen letters are typed by holding down an auxiliary key while pressing the key with the intended letter. WordWise does not use a vocabulary database/dictionary to search for words to resolve ambiguous, unambiguous, or a combination thereof entries.

Zi Corporation teaches a predictive text method, eZiText® (2002 Zi Corporation), but does not teach nor anywhere suggest explicit text filtering in ambiguous mode, nor in combination with 2-key explicit entry, stem-locking, or n-gram searches.

A Need for Improvements to Current Disambiguation Methodologies.

Disambiguating an ambiguous keystroke sequence continues to be a challenging problem. A specific challenge facing disambiguation is providing sufficient feedback to the user about the keystrokes being input. With an ordinary typewriter or word processor, each keystroke represents a unique character which can be displayed to the user as soon as it is entered. But with word-level disambiguation, for example, this is often not possible, because each entry represents multiple characters, and any sequence of entries may match multiple objects, such as, words or word stems, for example. Such ambiguity is especially a problem when, for example, the user makes a spelling or entry error and the user is not certain of such error until the complete sequence is entered and the desired result is not presented. In another example, previous systems utilizing word-level disambiguation fail to provide any feedback until a predetermined selection, such as a specific key selection, is made that is recognizable by the system as a termination selection, e.g. the space key.

Moreover, some alphabets, such as That and Arabic, contain more letters than the alphabet for English, which leads to even greater ambiguity on a reduced number of keys. Efficient input of these languages demands a mechanism for reducing that ambiguity when needed.

Therefore, it would be advantageous to provide a disambiguating system which reduces the apparent ambiguity on the display during entry and improves the user's ability to detect and correct spelling and/or entry errors.

It would also be advantageous to provide a disambiguating system which reduces ambiguity and increases efficiency by providing explicit filtering capabilities such that a list of candidate words, word stems, sequence of symbols, and the like, is narrowed, and the user can subsequently be offered a word completion or sequence completion quicker. More specifically, it would be advantageous to allow locking in a current state of interpretation of a part of or all of previously entered characters including, but not limited to an object and/or word stems, and explicitly entered characters, thereby preventing reinterpretation of previous entries.

It would also be advantageous to build around explicitly entered characters as anchors, for the end of or beginning of new objects, words, or word stems.

It would also be advantageous to offer reasonable guesses for extending objects or words by n-gram analysis of preceding explicitly entered characters.

It would also be advantageous to reduce ambiguity and increase efficiency during the process of disambiguating a linguistic object, such as a word or word stem, for example, by preventing reinterpretation of previous entries.

It would also be advantageous to recognize common delimiters entered ambiguously or explicitly as suggesting a point connecting two separate sets of characters to suggest where the interpretation of keystrokes could be restarted.

SUMMARY OF THE INVENTION

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

BRIEF DESCRIPTION OF THE DRAWINGS

FIG. 3 is an example chart of European letters and some special symbols shown on the 0-9 keys and their respective Shift keys according to the invention;

DETAILED DESCRIPTION OF THE INVENTION

The present invention relates to a method and apparatus for explicit filtering in ambiguous text entry. The invention provides embodiments including various explicit text entry methodologies, such as 2-key and long pressing. The invention also provides means for matching words in a database using build around methodology, stem locking methodology, word completion methodology, and n-gram searches.

More specifically, the present invention relates to a method and apparatus for explicit filtering in an ambiguous text entry mode, for extending and interpreting objects, words, word stems, and the like, and for stem-locking. One specific embodiment of explicit filtering for reducing ambiguity uses a variety of explicit entry means, including a 2-key explicit entry feature, wherein a key depression in combination with a matrix display are used. An extending and interpreting methodology is provided wherein complex phrases are allowed to be typed in. Predetermined sets of characters are "built around" as anchors for the end or beginning of new words or word stems. Reasonable guesses are offered for extending words by "n-gram" analysis of preceding explicit letters. Specifically, three specific embodiments using stem-locking are provided, wherein the first embodiment uses a combination of the n letters of a desired object, such as a word, and a next key. The second embodiment locks in the stem portion of the object and resolves the unlocked portion of the object. The third embodiment uses n-gram searches.

Figure 1:
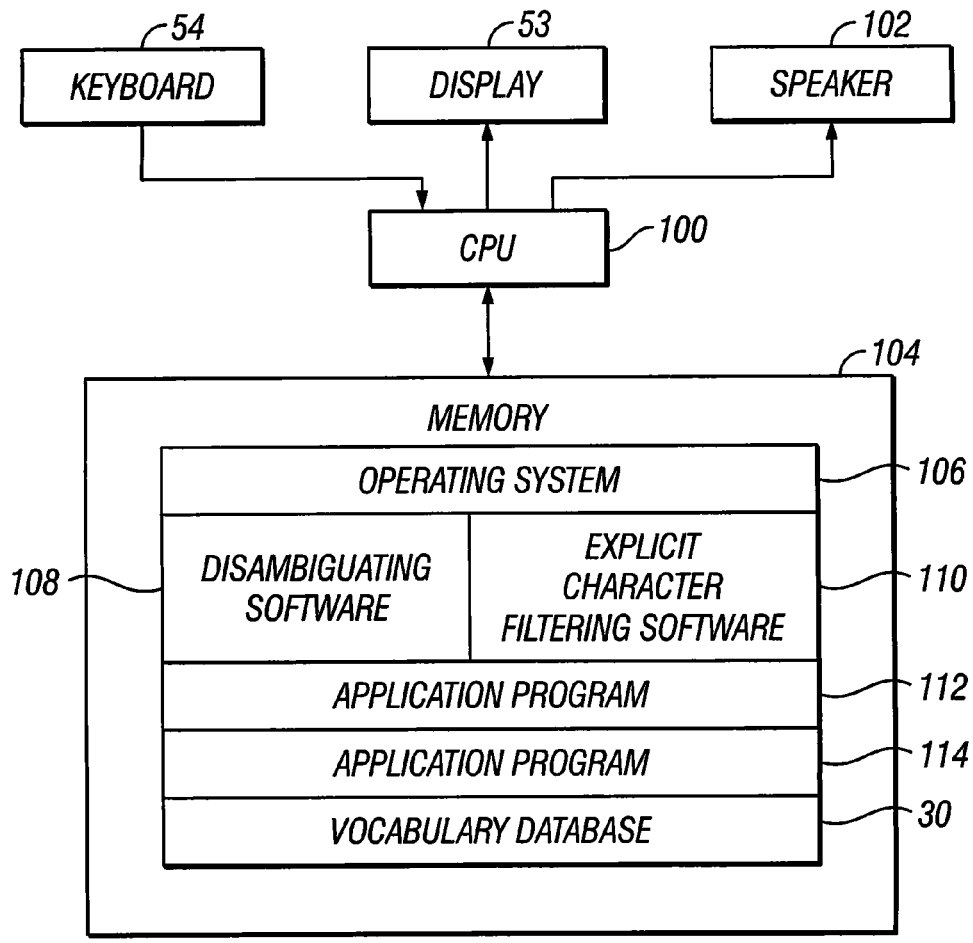
FIG. 1 is a hardware block diagram of the explicit character filtering system according of the invention.

A block diagram of a preferred embodiment of the reduced keyboard disambiguating system hardware is provided in FIG. 1. The keyboard 54 and the display 53 are coupled to a processor 100 through appropriate interfacing circuitry. Optionally, a speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated explicit character filtering in ambiguous text entry software and/or extending and interpreting software 110 that is discussed in additional detail below. The memory also includes a vocabulary database 30. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid. Therefore, the output, in this case, might be vocally output from the speaker.

It should be appreciated and understood by one of ordinary skill in the art that the discussion applies to symbols and sequences of symbols, which, when combined make an object or part of an object. A typical example of a symbol is a character in any language, such as a letter, digit, punctuation mark, or any other symbol from a language. A typical example of an object or part of an object is a word or part of a word. However, the discussion herein equally applies to Japanese kana and Korean jamos. Also, it should be noted that the objects don't have to be linguistic, as the claimed disambiguating system herein can be used to look up icons, phone numbers, or inventory records, as long as a type of symbolic string representation is present. Therefore, it should be appreciated that use of the terms such as letter, word, word stem, and the like are not limited to only those applications, and are used to facilitate ease of reading and understanding the discussion herein.

Explicit Entry

Figure 2:
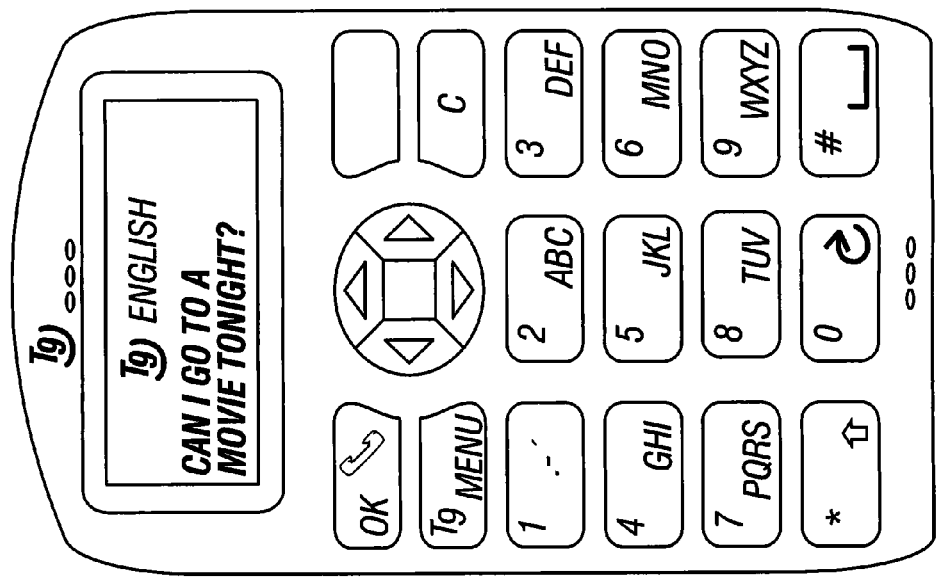
FIG. 2 is a picture of a wireless handheld device showing each letter of the English alphabet associated with a key according to the invention.

One preferred embodiment of generating an explicit character for the purpose of filtering word choices according to the invention provides a 2-key explicit entry feature. In many languages, such as English, all the letters associated with a key are printed on the key, such as depicted in FIG. 2, where FIG. 2 is a picture of an example wireless handheld device showing each letter of the English alphabet associated with a key according to the invention.

Figure 4:
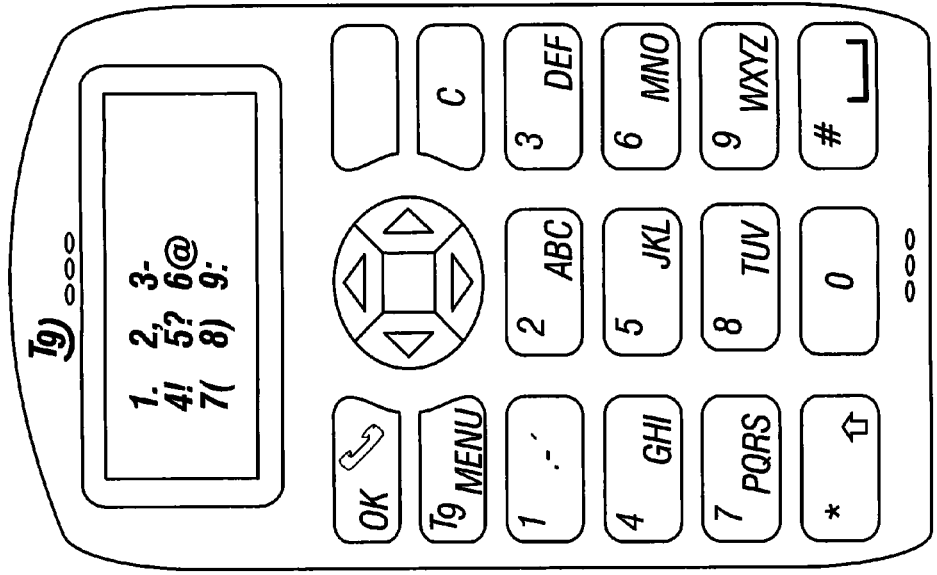
FIG. 4 is a sample screenshot of one 2-key matrix input method according to the invention.

However, other languages, such as French, include many more letters than can visually fit on a key, such as the cell phone key. FIG. 3 is an example chart of European letters and some special symbols shown on the 0-9 keys and their respective Shift keys. For example, if a user presses the 5 key, then a matrix display with the alphanumeric characters j, k, l, and 5 appear. FIG. 4 is a sample screenshot of one 2-key matrix input method according to the invention. After the first key has been pressed, the matrix of choices is displayed on the device panel. It should be appreciated that other labels printed on keys are possible, such as, for example, each key including a subset of predetermined sets of associated letters, such as displaying the first and last character of predetermined sets of associated letters.

Figure 5:
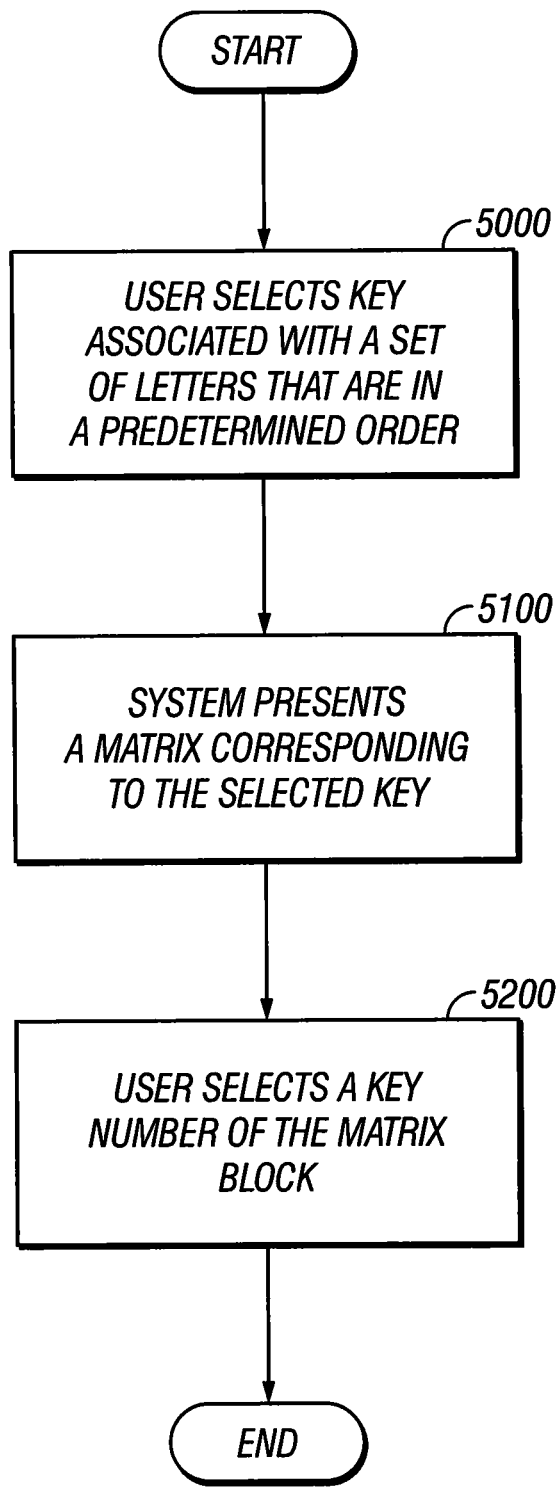
FIG. 5 is a flow chart of 2-key explicit entry for the explicit character filtering in ambiguous text entry system of FIG. 1.

FIG. 5 is a flow chart of 2-key explicit entry for the explicit character filtering in ambiguous text entry system of FIG. 1. According to a preferred embodiment of the invention, for a user to explicitly select one of many letters assigned to a key, as in the case of the French language, the user selects, such as by depression, the associated key (5000). The selection, e.g. depression, of the desired key causes the system to presents a second set of letters, such as in matrix form, that corresponds to the selected key (5100). Each block in the matrix includes a letter from the set of letters associated with the just selected/depressed key. FIG. 4 shows an example of what is displayed as a result of depressing the 1 key. All that is required at this point is for the user to select the key number of the matrix block that includes the desired character (5200). This explicit selection process only requires at maximum 2 key selections/depressions for the selection of a letter.

It should be readily apparent to one of ordinary skill in the art that the 2-key explicit entry method for the purpose of filtering can be extended to any other language. It should also be apparent to one of ordinary skill in the art that alternate configurations are possible, such as, for example, a scrolling list.

Figure 8:
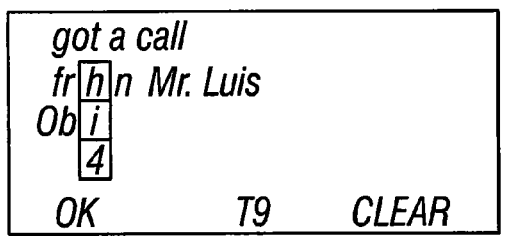
FIG. 8 shows an example of explicit entry by long-pressing on a key according to the invention.

According to an alternate configuration, the user selects a key by way of a long-press to display and cycle through the character sequence on that key. As shown in FIG. 8, some or all of the characters may scroll past in a preview window as long as the key is being pressed. When the key is released, the last highlighted character is accepted.

In yet another configuration, after the character sequence is presented by way of the long-press on the key, the character appears or is highlighted each additional time the key is pressed. The presentation of each explicit character may end when a sufficient time elapses between one key press and the next or when a different key is pressed.

In yet another configuration, after the character sequence is presented by way of the long-press on the key, the character appears or is highlighted each additional time a navigation key is pressed, where a navigation key is, for example, an arrow key or a scrolling wheel.

Following is a list of other explicit entry means for filtering. It should be appreciated that the list is meant by example only, and is not exhaustive:

long pressing on a key to enter a number/digit explicitly;

changing to a numbers mode and pressing a key to enter a number/digit explicitly (and then returning to ambiguous entry mode for filtering);

changing to a multi-tap mode and pressing a key repeatedly to enter a character explicitly (and then returning to ambiguous entry mode for filtering);

interpreting ambiguous mode key presses as an explicit character, either by grouping each pair of key presses as a 2-key explicit entry, or by grouping repeated presses of the same key as a multi-tap entry;

using multi-switch keys, such as a 5-way rocker, which permits ambiguous entry on a simple press and an explicit character entry on a different kind of press; and by "chording," which means by pressing more than one key simultaneously, with a primary key indicating an ambiguous set of characters and a secondary key indicating which character in the set to select (e.g., on a video game controller).

Another means of explicit entry for filtering is when any character assigned to a key is offered to the user through a secondary means, e.g., displayed on the label of a programmable key, or "softkey", which if chosen would be entered explicitly. The softkey mechanism allows correction of the last keystroke entered, e.g., if the user is extending a word with additional characters or wishes to correct the displayed interpretation before the entire word is entered. The additional character offered would be based on an analysis of the most likely character associated with the preceding keystroke, or based on the words in the current word candidate list. Assuming the most likely character was already displayed in the ambiguous word choice, then the second most likely character would be offered. For instance, if the user wants to type "ram" and enters the key sequence 726, the word "ran" appears. The most likely letter for that position in the word candidate list associated with 726 is "m", then "m" could be offered on the softkey. When the user presses the softkey, the "m" replaces the "n" in the word "ran".

Explicit Character Filtering in Ambiguous Mode

Explicit character filtering in ambiguous mode is when a character is explicitly entered during entry of a sequence of ambiguous entries. One embodiment of explicit entry already discussed is the 2-key explicit entry method using a matrix as described above. According to another preferred embodiment of the invention, explicit entry of a character is accomplished by a long depression of the associated key. When one or more characters in a sequence of characters is explicitly entered, only stored words with that explicitly selected character(s) in the corresponding position(s) are retrieved.

One way of retrieving the desired word according to one embodiment of the invention is when an explicit character is entered in ambiguous entry mode, then the disambiguating filtering system continues to match database words against the ambiguous and explicit letters as long as possible, rather than accepting the default word upon the first explicit letter. If there is no match, the last ambiguous word selected is accepted and a new letter is appended to it.

As an example, suppose a user wants to enter the word "home" in English T9. The user long presses the 6 key in the $3^{rd}$ position to explicitly select "m," resulting in only "home," and, in addition, word stems "imme" and "gome" after 4 keystrokes.

Another example is using a mixed alphanumeric word like "cu2night", which could be stored in a database. If the user long presses on the 2 key, then explicitly enters a "2," words such as "cub" are thus filtered out from the word candidate list.

Explicit filtering is another way to quickly offer word completions. If "cu2night" was in a database, and "cu" was entered ambiguously followed by "2" explicitly, all ambiguous interpretations of the keystroke sequence "282" will be filtered out, leaving "cu2night" as a more likely choice to be offered through word completion.

Figure 6:
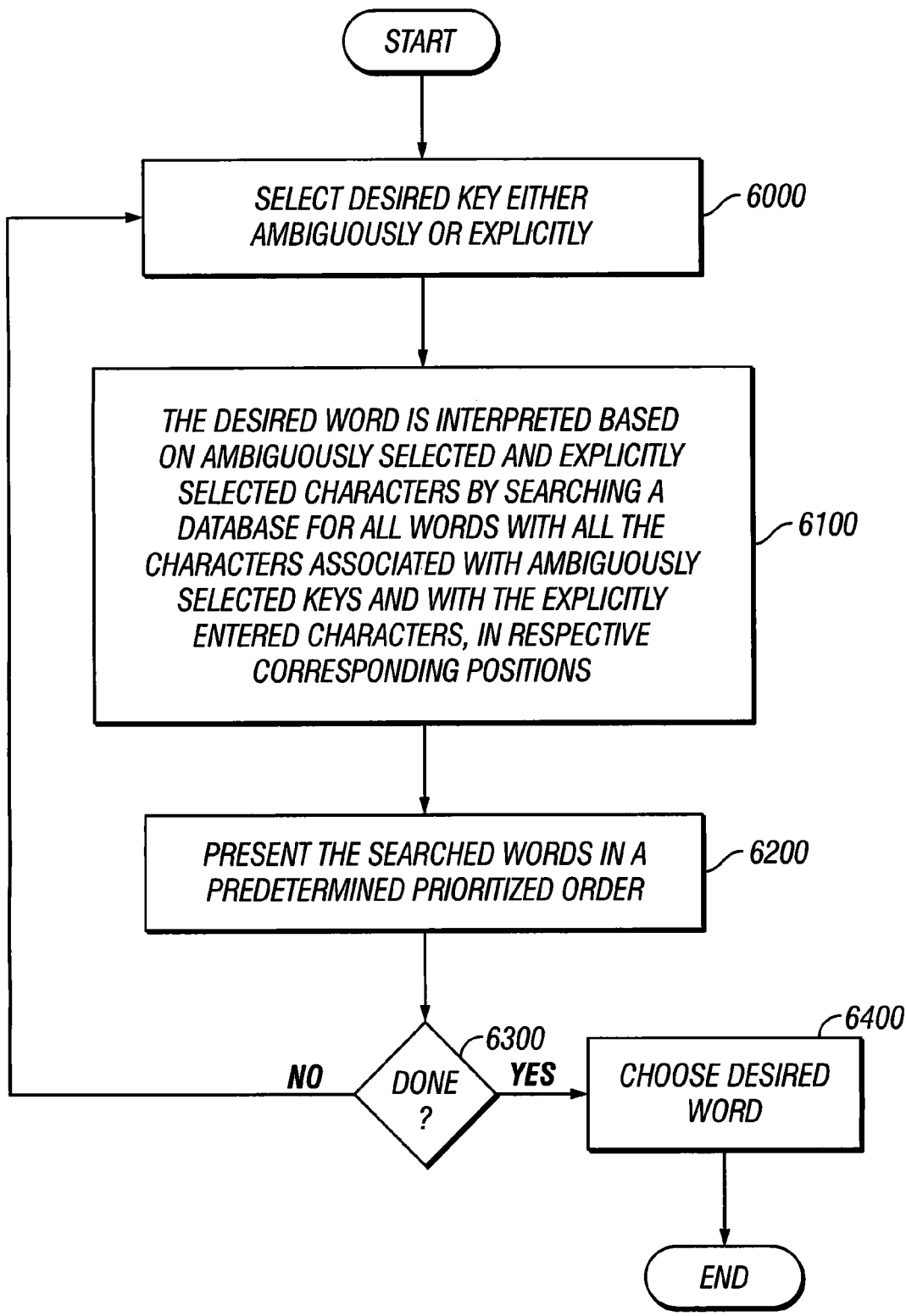
FIG. 6 is a flow chart for explicitly filtering in ambiguous mode according to a preferred embodiment of the invention.

FIG. 6 is a flow chart for explicitly filtering in ambiguous mode according to a preferred embodiment of the invention. A character is desired and its associated key is entered either ambiguously or explicitly (6000). The desired word is then interpreted based on the sequence of ambiguously selected keys (i.e. their associated characters) and the explicitly selected characters. The database is searched for words with the characters associated with ambiguously selected entries, e.g. keys, and with the explicitly entered characters, in their respective corresponding positions (6100). The searched words are then presented or displayed in a predetermined prioritized order (6200), such as a most frequently used order. If the desired word is among the set of presented searched words (6300), then the desired word is chosen (6400) and the process ends. Otherwise, the process is not over and steps are repeated from selecting a desired key (6000).

Build Around

In another aspect of the disambiguating filtering system, words from the database can be "built around" explicitly or ambiguously entered characters, or, additionally characters from a predetermined set of characters. According to one interpretation, the matching words, if any, include the explicit character for a particular sequence. However, additional interpretations of the sequence may include: one or more words that match the ambiguous keys that precede and/or end with the explicit character; one or more matching words that begin with the explicit character if any; and one or more words that match the ambiguous keys that follow the explicit character. For example, if the key sequence for "gifts4less" is entered, with the digit "4" entered explicitly, the words "gifts" matches the ambiguous key sequence preceding the explicit character and "less" matches the key sequence following it, even if "gifts4less", "gifts4", and "4less" are not found in the database. Similarly, "mobile.com" may be typed as one word automatically constructed from the database entries "mobile" and ".com", or from the entries "mobile" and "." and "corn" if there is a key for ambiguous punctuation; in either of those cases the period may not need to be explicitly entered.

Figure 9:
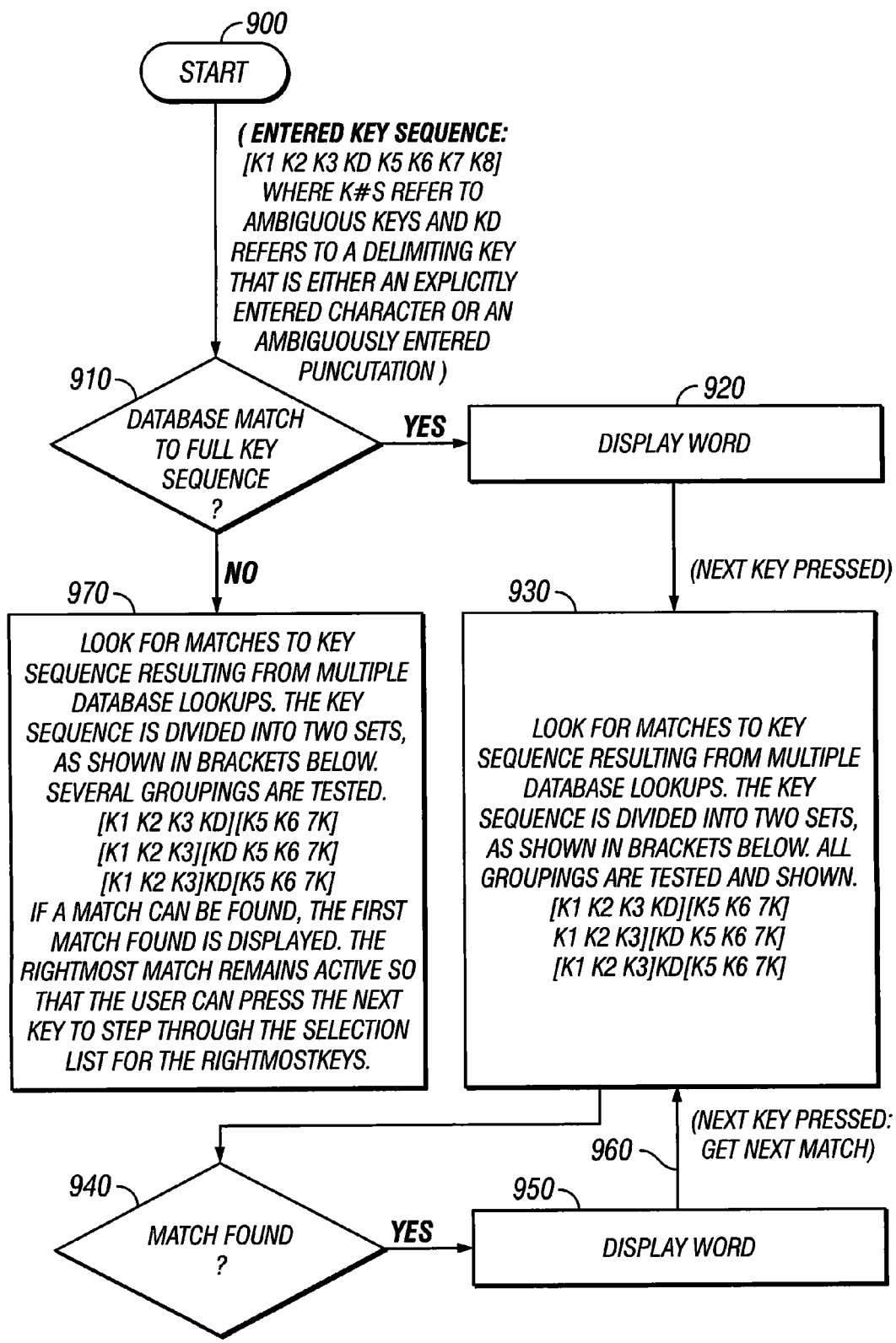
FIG. 9 is a flow chart depicting a build around example according to the invention.

One embodiment of the build around concept can be described with reference to FIG. 9, a flow chart depicting a build around example. The build around method starts (9000) with a key sequence being entered, e.g., [k1 k2 k3 kd k5 k6 k7 k8]. The k#'s refer to ambiguously entered keys and kd refers to a delimiting key that can be either an explicitly entered character an ambiguously entered punctuation character. The method then determines if the database found a match (9100). If yes, a word is displayed (9200). If the user desires to proceed to the next choice in the list of words found by the database, the user presses a next key to request further look-ups by the database (9300). Specifically, the database is multiply searched for matches to key sequences. A key sequence is divided into two sets on either side of a delimiter. An example of various groupings of two sets of sequences divided by a delimiter follows:

[k1 k2 k3 kd] [k5 k6 k7 k8];
[k1 k2 k3] [kd k5 k6 k7 k8]; and
[k1 k2 k3] kd [k5 k6 k7 k8].

If a match is found among any of the groups (9400), then the desired word is chosen and displayed (9500). If the user desires to build around this sequence, the user can press a next key to obtain the next set of results from multiple searches to the database (9600).

If the database did not find an initial match (9100), then the database is multiply searched for matches to key sequences (9700), wherein a key sequence is divided into two sets on either side of a delimiter, description of which and examples of which are presented above.

It should be appreciated that means to search for and display/present the set of possible desired words can vary and still remain within the scope and spirit of the invention.

Stem-Locking

In the preferred embodiment of the invention, stem-locking is locking one or more subsequences or substrings of characters within a sequence. For example, the first n-numbers of sequence of characters of a word can be locked in. The way stem-locking works is that only words with those locked in characters are searched. For instance, suppose a user selects the 4 and then the 6 key of a wireless cell phone using T9 technology. The word "go" is presented in the display. If "go" is locked in, then upon subsequent key selections, only words with "go" in the first two positions are selected.

The locking of letters can be performed in a number of different ways. For example, two such ways are by a "full next locking" mechanism and an "unbounded" methodology by moving a cursor over characters to select. As an example of implementing "full next locking," a "next" key is used. That is, according to one embodiment of the invention, selecting a "next" key locks in a previously presented series of characters, thereby eliminating the possibility of the system re-interpreting the object by re-interpreting the locked in series of characters. The selected series of characters are now marked as explicitly entered. An example of moving the cursor over characters (unbounded) according to one embodiment of the invention, the cursor is moved to the beginning of a series and by the user selecting a right-arrow key (or a left-arrow key, for example, in the Hebrew language), all the characters that the cursor moved over are locked in.

Another aspect of full next locking is locking a previously presented series of characters when likely word boundaries are identified. Such boundaries can be identified based on certain sequences of interactions, such as, for example, when the user "nexts" and then selects a symbol or punctuation character; or, when the user "nexts" and then enters an explicit number.

It should be appreciated that other methods to "lock" include, but are by no means limited to:
  pressing a key assigned to the "lock" function, such as an OK or Select key; and
  pressing an appropriate arrow key to "lock" in a word completion being offered.

Stem locking approaches, such as those discussed above, can be related to "build around" as described herein above. That is, once a sequence has been locked in, it can be "built around."

Japanese Kana Example

Another example of the disambiguating filtering methodology is in the Japanese language. Sub-phrases in kana (phonetic) character form can be converted to kanji (Yomikata), and those converted sub-phrases may in turn filter interpretations of the remaining ambiguous kana preceding or following the converted sub-phrases, excluding interpretations that can't be used to construct valid phrases.

In another embodiment of the invention, a hierarchy of locks mechanism is used. For example, a right arrow key can lock in all characters to the left of the cursor. Therefore, in this implementation, a right-arrow key locks in a first-choice stem, while a "next" key locks in a not-first-choice stem.

Another implementation is using a "select" key instead of a right-arrow key in combination with a "next" key. For example, the "select" key can be used at the end of each ambiguous key sequence for either selecting and accepting the default choice (the select key is pressed once) or for selecting an alternative choice (the select key is pressed more than once until the desired choice appears or is highlighted). In this case, the "select" key is used to stem lock either the first or alternate choices, rather than using the right-arrow key for the first choice and the "next" key for other choices (or vice-versa, as the choice of keys is arbitrary, yet predetermined).

Word Extension and Completion

Another aspect of the invention is the system automatically starting a new word at a lock position. For example, the user enters "car" and locks it, and then enters the keys for "pet". "Carpet" is shown because it is a complete word in the database. The word "carset" is also shown because it is "car"+ "set", which is another example of the "build around" concept, where an ambiguous sequence may follow an explicit character entry, causing one interpretation to be the beginning of a new ambiguous word.

Alternatively, when one or more previously-accepted characters precedes (is adjacent to, without spaces) the current and active ambiguous key sequence. The system uses the preceding characters to match words and phrases (e.g., in the user database) that begin with those characters and that match an ambiguous key sequence following those characters. Optionally, one or more word completions is offered. An example follows. A user enters and locks in (accepts) the characters, "con." Then, the user types ambiguous keys for "stan" and is offered "constantinople" as a word completion. In this example, the user could have used a left-/right-arrow key to accept "con" to be used to filter and to suggest word completions that begin with the accepted chars and are immediately adjacent to an ambiguous key sequence. Hebrew and other languages go the other direction, hence right-side-only is not assumed.

Figure 7:
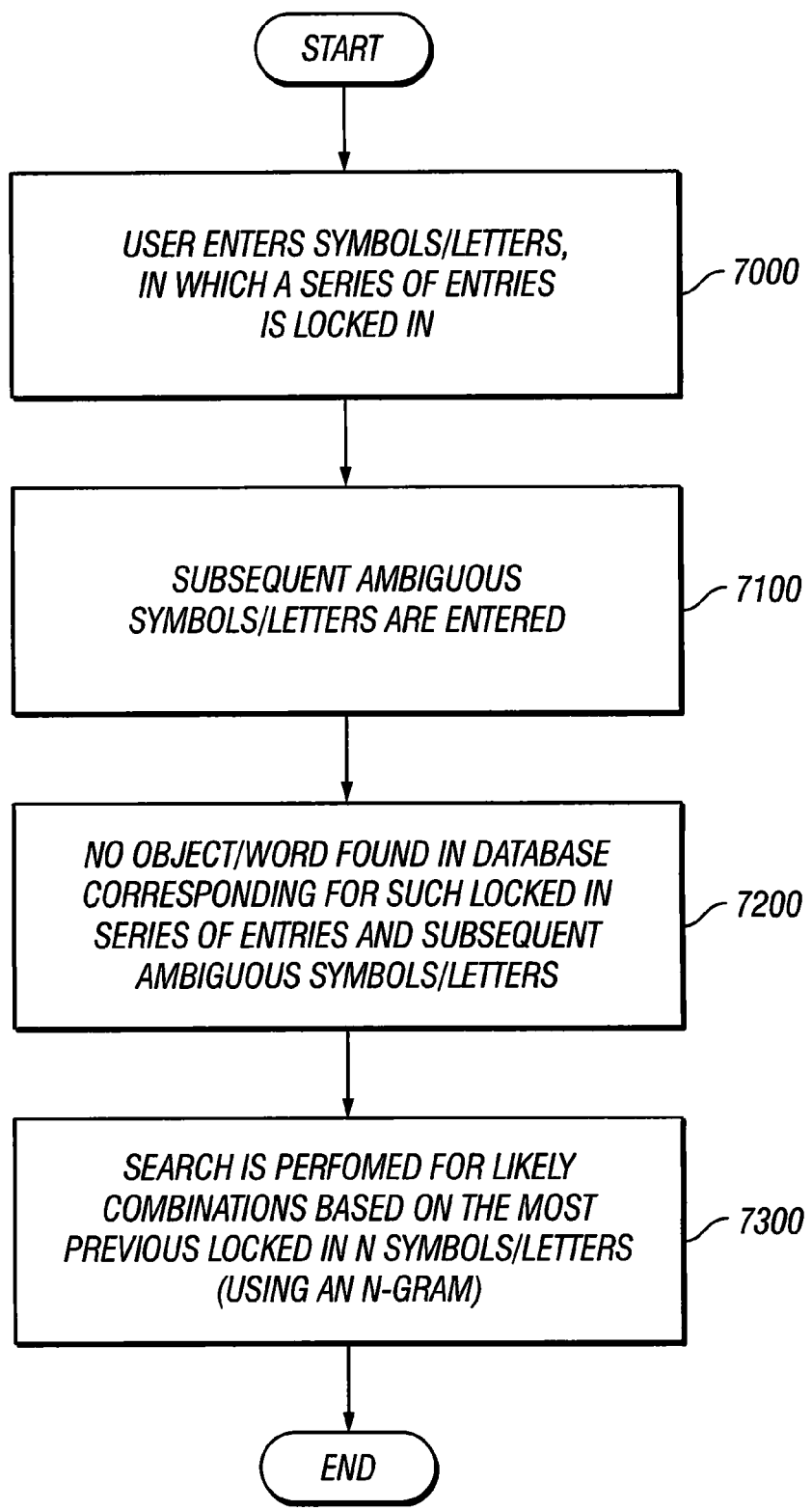
FIG. 7 is a flow chart of a method for generating words not stored in the database according to the invention.

FIG. 7 is a flow chart of a method for generating words not stored in the database according to the invention. That is, in an equally preferred alternate embodiment, if a series of entries is locked in (7000) and subsequent ambiguous characters entered (7100) and a corresponding stored word is not found in the database (7200), then searches are performed for likely combinations based on the previous n locked in characters (7300). In one preferred embodiment of the invention, an n-gram is used to find stored words. This is contrary to using the entire set of locked in letters. For example, suppose a user has entered and explicitly selected the word "flight", but the user, however, wants to enter the word "flightplan" which is not in the database. In this embodiment of the invention, the user then explicitly locks in the letter "p" and "l" after "flight". The system then searches for words using the last explicitly entered bigram (p and l). Thus, words that are not stored in the database are generated.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. An apparatus for explicit character filtering of ambiguous key input sequences, said apparatus comprising:
  a processor;
  a keyboard configured to accept a plurality of key inputs including explicit key inputs and ambiguous key inputs;
  wherein responsive to receiving an explicit key input, a single, unambiguous intended character is received;
  wherein an ambiguous key input indicates an intended character of a plurality of potentially intended characters, but the intended character is not known;
  a memory coupled to said processor, wherein said memory comprises:
  an object database storing objects associated with sequences of key inputs;
  the processor further configured to receive a first sequence of key inputs comprising a plurality of characters some of which are entered by explicit key input and some of which are entered by ambiguous key input and generate, based on the first sequence of key inputs, a first set of search character sequences, wherein each character of each search character sequence of the first set of search character sequences corresponds to either an explicit key input or an ambiguous key input in the first sequence of key inputs and is selected from the plurality of intended or potentially intended characters associated with the corresponding respective explicit key input or ambiguous key input;
  the processor further configured to search said database, based on the first set of search character sequences, for objects to identify a first set of potential desired objects found in said database and receive a selection of a first desired object from the first set of potential desired objects found in said database.

2. The apparatus of claim 1, wherein a desired object further comprises the one or more characters received by explicit key input.

3. The apparatus of claim 2, wherein the processor generates the desired object by concatenating characters in the following order: the characters of the first desired object, the one or more characters received by explicit key input, and the characters of the second desired object.

4. The apparatus of claim 1, wherein said plurality of potentially intended characters comprise letters, digits, punctuation marks, Japanese kana, Korean jamos, and icons.

5. The apparatus of claim 1, wherein objects comprise words, part of words, word stems, icons, phone numbers, inventory records, and sequences of characters.

6. The apparatus of claim 1, further comprising speech synthesis software and a speaker as a communication aid.

7. The apparatus of claim 1, wherein explicit key input is received by any combination of:
- 2-key explicit entry comprising two keys entered in sequence, wherein the combination of the two keys entered in sequence identifies a single unambiguous intended character;
- long pressing a key to display and cycle through a character sequence;
- long pressing on a key to enter a number/digit explicitly;
- changing to a numbers mode and pressing a key to enter a number/digit explicitly;
- changing to a multi-tap mode and pressing a key repeatedly to enter a character explicitly;
- interpreting ambiguous mode key presses as an explicit character, either by grouping each pair of key presses as a 2-key explicit entry, or by grouping repeated presses of the same key as a multi-tap entry;
- using multi-switch keys, thereby permitting ambiguous entry on a simple press and an explicit character entry on a different kind of press;
- chording by pressing more than one key simultaneously, with a primary key indicating an ambiguous set of characters and a secondary key indicating which character in the set to select; and
- using a softkey as a secondary means for offering any character assigned to a key based on analysis of most likely character associated with a preceding keystroke or based on words in a current word candidate list.

8. The apparatus of claim 7, wherein explicit key input by 2-key explicit entry comprises use of at least one of:
- a matrix display;
- a label including a subset of predetermined sets of associated characters; and
- a scrolling list.

9. The apparatus of claim 7, wherein long pressing a key to display and cycle through a character sequence further comprises, after a character sequence is displayed, either of:
- a next character in said character sequence is highlighted each additional time said key is pressed, ending after a sufficient time elapses between one key press and the next or when a different key is pressed; or
- a next character in said character sequence is highlighted each time a navigation key is pressed.

10. The apparatus of claim 1, wherein a selection of a desired object from a set of potential desired objects found in said database is received subsequent to displaying the set of potential desired objects in a pre-determined order.

11. A method for generating a desired object, said method comprising:
- receiving a first sequence of key inputs, some of which are explicit key inputs and some of which are ambiguous key inputs and;
- generating, based on the first sequence of key inputs, a first set of character sequences;
- wherein each character of each character sequence of the first set of character sequences corresponds to either an explicit key input or an ambiguous key input in the first sequence of key inputs and is selected from the plurality of intended or potentially intended characters associated with the corresponding respective explicit key input or ambiguous key input; and
- searching a database, based on the first set of search character sequences, for objects to identify a first set of potential desired objects found in said database and receiving a selection of a first desired object from the first set of potential desired objects found in said database.

12. The method of claim 11, wherein a desired object further comprises the one or more characters received by explicit key input.

13. The method of claim 12, further comprising generating the desired object by concatenating characters in the following order: the characters of the first desired object, the one or more characters received by explicit key input, and the characters of the second desired object.

14. The method of claim 11, wherein said plurality of potentially intended characters comprise letters, digits, punctuation marks, Japanese kana, Korean jamos, and icons.

15. The method of claim 11, wherein objects comprise words, part of words, word stems, icons, phone numbers, inventory records, and sequences of characters.

16. The method of claim 11, wherein explicit key input is received by any combination of:
- 2-key explicit entry comprising two keys entered in sequence, wherein the combination of the two keys entered in sequence identifies a single unambiguous intended character;
- long pressing a key to display and cycle through a character sequence;
- long pressing on a key to enter a number/digit explicitly;
- changing to a numbers mode and pressing a key to enter a number/digit explicitly;
- changing to a multi-tap mode and pressing a key repeatedly to enter a character explicitly;
- interpreting ambiguous mode key presses as an explicit character, either by grouping each pair of key presses as a 2-key explicit entry, or by grouping repeated presses of the same key as a multi-tap entry;
- using multi-switch keys, thereby permitting ambiguous entry on a simple press and an explicit character entry on a different kind of press;
- chording by pressing more than one key simultaneously, with a primary key indicating an ambiguous set of characters and a secondary key indicating which character in the set to select; and
- using a softkey as a secondary means for offering any character assigned to a key based on analysis of most likely character associated with a preceding keystroke or based on words in a current word candidate list.

17. The method of claim 16, wherein explicit key input by 2-key explicit entry comprises use of at least one of:
- a matrix display;
- a label including a subset of predetermined sets of associated characters; and
- a scrolling list.

18. The method of claim 16, wherein long pressing a key to display and cycle through a character sequence further comprises, after a character sequence is displayed, either of:
- a next character in said character sequence is highlighted each additional time said key is pressed, ending after a sufficient time elapses between one key press and the next or when a different key is pressed; or
- a next character in said character sequence is highlighted each time a navigation key is pressed.

19. The method of claim 11, wherein a selection of a first desired object from a set of potential desired objects found in said database is received subsequent to displaying the set of potential desired objects in a pre-determined order.

* * * * *